UNITED STATES PATENT OFFICE.

LEONARD SCHADE VAN WESTRUM, OF BERLIN, GERMANY.

COMPOSITION OF MATTER.

No. 814,750. Specification of Letters Patent. Patented March 13, 1906.

Application filed January 27, 1905. Serial No. 242,979.

*To all whom it may concern:*

Be it known that I, LEONARD SCHADE VAN WESTRUM, a subject of the Queen of Holland, residing at Berlin, Germany, have invented new and useful Improvements in Composition of Matter, of which the following is a specification.

My invention relates to a process of and product for rendering packings, insulations, lubricating materials, and the like insoluble in petroleum or any of its products or residues.

It has been impossible heretofore to produce packings and insulating material which would withstand the action of petroleum or its equivalent for any length of time.

My invention in general terms consists in so treating packing, insulation, and other material in such manner that petroleum will have no detrimental effect thereon.

The invention is based upon the principle that petroleum, naphtha, and the like will not dissolve castor-oil or lime-soaps of which castor-oil is a constituent; and it consists in first impregnating packings, &c., with castor-oil at a temperature of from 100° to 120° Celsius and thereafter covering such impregnated material with a mixture comprising one part of talc, one part of asbestos-powder, and one part caustic lime. The office of the caustic lime is to saponify the castor-oil and produce a compact homogeneous plastic mass which will resist the action of petroleum or the like lubricants.

Should it be desired to produce a paste-like mass to be used for the purpose above specified, a mixture is made consisting of five parts of castor-oil heated in boiling water, three to four parts of fine graphite, and one to five parts of caustic lime, which mixture is saponified and when cold may be filled into cans or other receptacles.

It will be understood that my invention is not limited in its use to packing and insulating materials, but may be used on all material upon which petroleum or any of its products or residues may have a detrimental effect.

Having now described my invention, what I claim as new, and desire to secure by Letters Patent, is—

1. A composition of matter for preventing packings and the like from being dissolved by petroleum or equivalent lubricant, comprising castor-oil and caustic lime, producing saponification, substantially as described.

2. A composition of matter for preventing packings and the like from being dissolved by petroleum or equivalent lubricant, comprising five parts of castor-oil, three to four parts of fine graphite and one to two parts of caustic lime, substantially as described.

In testimony whereof I have signed my name to this specification in the presence of two subscribing witnesses.

LEONARD SCHADE VAN WESTRUM.

Witnesses:
 H. M. KUEHNE,
 JOHN A. PERCIVAL